(12) United States Patent
Hullot (10) Patent No.: US 8,390,566 B2
(45) Date of Patent: *Mar. 5, 2013

(54) WALLPAPER FOR ELECTRONIC DEVICES

(75) Inventor: Jean-Marie Hullot, Bougival (FR)

(73) Assignee: Apple Inc., Cupertino, CA (US)

( * ) Notice: Subject to any disclaimer, the term of this patent is extended or adjusted under 35 U.S.C. 154(b) by 1228 days.

This patent is subject to a terminal disclaimer.

(21) Appl. No.: 11/592,697

(22) Filed: Nov. 3, 2006

(65) Prior Publication Data

US 2008/0106531 A1    May 8, 2008

(51) Int. Cl.
*G09G 5/00* (2006.01)
*H04H 20/71* (2008.01)
(52) U.S. Cl. ............ 345/156; 345/169; 455/3.01
(58) Field of Classification Search .......... 345/169; 715/744–747, 867; 455/3.01, 566; 713/324
See application file for complete search history.

(56) References Cited

U.S. PATENT DOCUMENTS

| | | | |
|---|---|---|---|
| 6,487,390 | B1 | 11/2002 | Virine et al. |
| 6,874,094 | B2 * | 3/2005 | Parker ............ 713/310 |
| 7,598,945 | B2 * | 10/2009 | Lee ............ 345/169 |
| 7,634,299 | B2 * | 12/2009 | Mise et al. ............ 455/567 |
| 8,041,291 | B2 * | 10/2011 | Hullot et al. ............ 455/3.01 |
| 2001/0020925 | A1 * | 9/2001 | Hattori et al. ............ 345/87 |
| 2003/0225847 | A1 | 12/2003 | Heikes et al. |
| 2004/0003117 | A1 | 1/2004 | McCoy et al. |
| 2004/0056651 | A1 * | 3/2004 | Marietta Bersana ....... 324/207.2 |
| 2004/0090442 | A1 * | 5/2004 | Chen ............ 345/501 |
| 2004/0140989 | A1 | 7/2004 | Papageorge |
| 2004/0266416 | A1 * | 12/2004 | Matsumoto ............ 455/418 |
| 2005/0064852 | A1 | 3/2005 | Baldursson |
| 2005/0206806 | A1 * | 9/2005 | Yu ............ 349/64 |
| 2006/0073854 | A1 * | 4/2006 | Ono et al. ............ 455/566 |
| 2006/0248121 | A1 | 11/2006 | Cacenco et al. |
| 2007/0018957 | A1 | 1/2007 | Seo |

FOREIGN PATENT DOCUMENTS

| | | |
|---|---|---|
| EP | 1452970 A1 | 9/2004 |
| GB | 2373977 A1 | 10/2002 |
| WO | WO 03/061273 A1 | 7/2003 |

OTHER PUBLICATIONS

Wallpaper Magic, Free software downloads and software reviews, CNET Download.com, Version 2.5, Operating System: Windows 95/98/Me/2000/XP/NT, Mar. 26, 2004, downloaded Apr. 26, 2011 at http://download.cnet.com/Wallpaper-Magic/3000-2336_4-10015641.html, 6 pages.
Wallpaper Magic, NAPA Software, Copyright © 1997-2003, NAPA Software Inc., downloaded Apr. 26, 2011 at http://www.napasoftware.com/wallpaper_magic.html, 3 pages. SlideShow Desktop Release History, Multiple versions released between Jul. 16, 2001 and Nov. 16, 2010, Copyright © 2000-2010 Desktop Designs™, downloaded Apr. 26, 2011 at http://www.slideshowdesktop.com/history.htm, 13 pages.

\* cited by examiner

*Primary Examiner* — Bipin Shalwala
*Assistant Examiner* — Steven Holton
(74) *Attorney, Agent, or Firm* — Adeli & Tollen LLP (57) ABSTRACT

Methods, apparatuses, and machine readable media relating to background images are described herein. An apparatus, in one embodiment, includes a processor for causing a display to display a main image and a memory for storing a plurality of background images. The processor is arranged to cause the display to display a background image at the same time as or in preference to the main image. A different background image may be automatically selected for display each time a predetermined event occurs. Methods, media, and other apparatuses are also described.

40 Claims, 8 Drawing Sheets

PRIOR ART

WALLPAPER FOR ELECTRONIC DEVICES

FIELD OF THE INVENTION

The present invention relates to electronic devices capable of displaying background images and to improvements therein.

BACKGROUND OF THE INVENTION

Figure 1A:
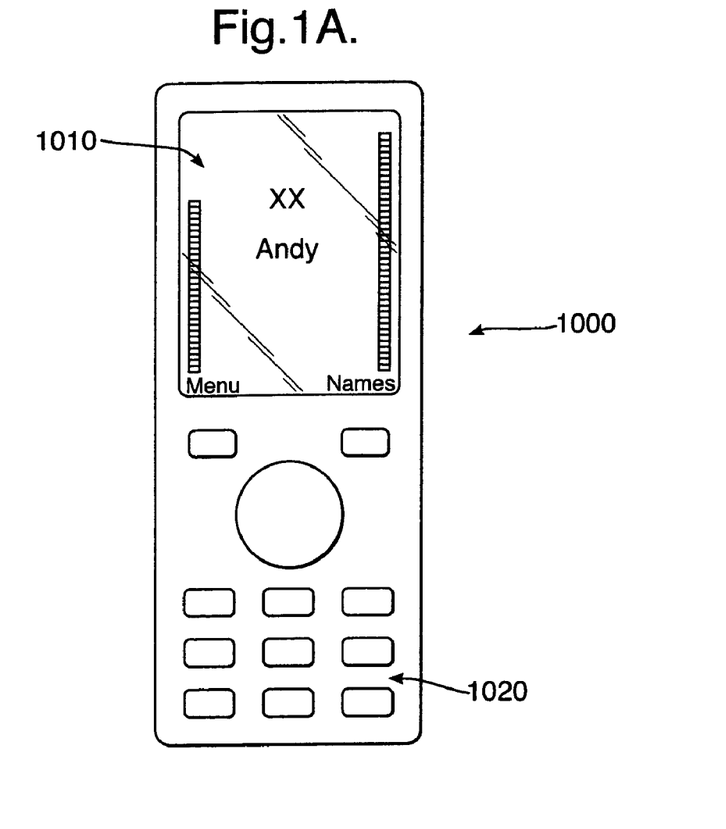
FIG. 1A illustrates a mobile phone displaying a main image and a background image simultaneously.
Figure 1B:
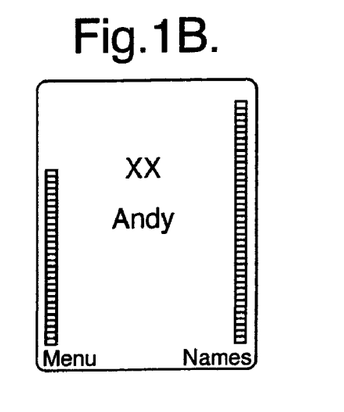
FIG. 1B illustrates the main image displayed by the mobile phone in FIG. 1A.
Figure 1C:
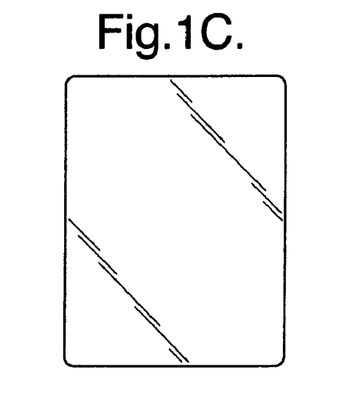
FIG. 1C illustrates the background image displayed by the mobile phone in FIG. 1A.

It is known for electronic devices to display both a main image representing useful information relating to the device and a background image. An example is shown in FIG. 1A, which illustrates a mobile telephone 1000 comprising a keypad 1020 and a display 1010. The display shows a combination of two distinct images. The first, shown in FIG. 1B, is a main image and includes useful information such as the name of the mobile telephone service carrier (XX), the name of the user (Andy), menu selection information (Menu and Names), a reception bar on the right indicating the strength of a signal received by the mobile phone, and a power bar on the left indicating the power remaining in the battery. Thus, it will be clear that the main image need not be a single unitary image, but also can correspond to a plurality of separate icons or other images displayed at the same time.

This main image is superimposed on a background image, shown in FIG. 1C. In this example, the background image simply comprises a number of wavy lines. However, it could comprise any image, such as a picture, a photograph or an animated image. Again, the background image need not be a single unitary image, but also can correspond to a plurality of separate icons or other images displayed at the same time. The background and main images, or parts thereof, may also be video clips and the like.

In the example shown in FIG. 1, a digital clock could be included at the top right of the main image. Alternatively, the main image could include a representation of an analogue clock. Thus, the main image may also be animated. As an alternative, the clock could be included in the background image instead of the main image. Thus, the elements to be included in the main image and the background image are to some extent interchangeable.

In general, the main image will change during use of the phone. For example, if an incoming call is received, the main image will be altered to reflect this to the user. In particular, it is well-known for the main image to change to display the name and/or number of the caller. Similarly, if the user wishes to make a phone call, he may use an address book provided in the phone. As the user scrolls through the address book, the main image will change to guide him or her through the address book. Similarly, the main image will change as the user is guided through different levels of the menu system provided in the phone.

However, the background image need not, and generally does not, change as the main image changes. Such a background image is commonly referred to as a wallpaper image since it can comprise a repeated pattern and appear similar to conventional wallpaper used for interior decoration. Generally, the wallpaper or background image is decorative, although it may also have an information-providing function, such as the clock discussed above.

It is known to store several background images in the phone and for the user to be able to set manually which background image is displayed.

It is also known for mobile phones to "deactivate" after the phone has not been used for a certain period of time. In one example, the phone comprises a conventional liquid crystal display (LCD) device with a backlight. If the phone has not been used for a predetermined period of time, the phone enters a sleep mode in which the backlight is switched off to save energy. In this specification, the term "deactivate" and like terms include, for example, switching off of the backlight. Of course, the LCD may also be front lit.

A mobile phone or other electronic device may have any one or more of several different kinds of deactivation. In the example discussed above, another instance of deactivation may be to lock the keypad, for example after a further predetermined period has elapsed following switching off of the backlight. If the keypad is locked, then pressing of the keys will not control the phone in the way required by the user until a predetermined key or combination of keys has been pressed to unlock the keypad. Pressing the correct key or combination of keys will not only unlock the keypad, it will also switch the backlight on again.

In this example, another instance of deactivation may be to enter a sleep mode and switch off the display altogether or to display an energy-saving display, such as an unlit, mostly black display, with a clock. The phone may enter the sleep mode, for example, after a further predetermined period has elapsed following locking of the keypad. Another instance of deactivation may be to switch off the phone completely. The phone could also be deactivated after the user finishes making a call or when the user enters an instruction for deactivation.

SUMMARY OF THE INVENTION

The foregoing examples of mobile phones meet the functional requirements or users effectively. However, more demanding users are easily bored and seek further improvements. Moreover, as the market becomes increasingly saturated, product differentiating features become increasingly important.

According to the present invention there is provided an electronic device comprising a display, a processor for causing the display to display a main image, and a memory for storing a plurality of background images, wherein the processor is arranged for causing the display to display a said background image at the same time as or in preference to the main image; and wherein a different background image is automatically selected for display each time a predetermined event occurs. At least one part of the device may be arranged to be deactivated in consequence of the predetermined event, and a different background image is automatically selected for display each time the device is deactivated in consequence of the predetermined event. The predetermined event may be the elapse of a predetermined time after the electronic device is last used. The display may be deactivated by being switched off in consequence of the predetermined event. A keypad of the device may be deactivated by being locked in consequence of the predetermined event. The device may be deactivated by entering a sleep mode.

BRIEF DESCRIPTION OF THE DRAWINGS

Embodiments of the present invention will now be described by way of further example only and with reference to the accompanying drawings, in which.

DETAILED DESCRIPTION

Figure 2:
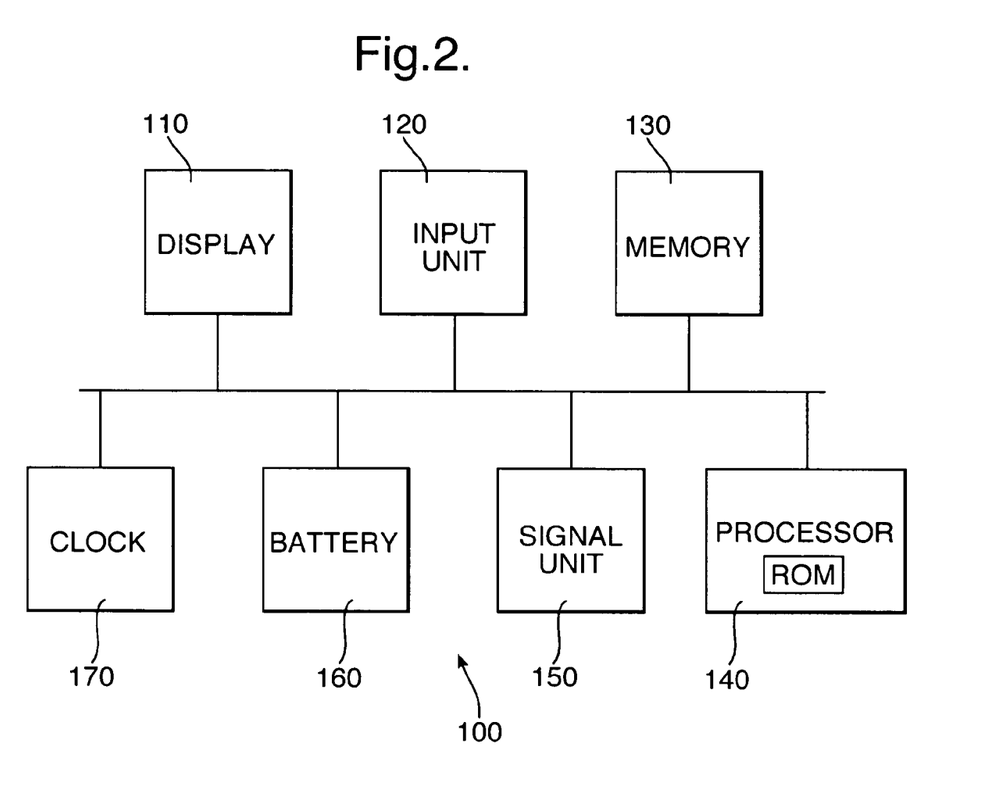
FIG. 2 is a block diagram of the architecture of an electronic personal digital assistant (PDA) suitable for use in the present invention.

FIG. 2 is a block diagram of the architecture of a personal digital assistant (PDA) 100 suitable for use in the present invention. The PDA 100 includes a display 110, by which both main and background images can be displayed under the control of a processor 140. The processor 140 also has control of other functions of the PDA 100 and includes a read only memory ROM, in which are stored instructions for operating the processor. However, the ROM may be provided separately from the processor. The instructions can be provided in the form of hardware or software.

The PDA 100 further comprises an input unit 120, such as a keyboard, by which a user may enter information; a memory 130 for storing the user's information, additional software for control of the processor and the like; a signal unit 150, such as an infra-red CODEC (coder/decoder), other modem, jack for an I/O lead etc, which allows the personal organiser to communicate with other devices for the exchange of information; a battery 160, which is preferably rechargeable, for powering the PDA 100; and a clock 170 for control of the timing of processor operations and for providing the PDA with a time-telling function.

Depending on how it is programmed, the processor 140 causes the display 110 to display a main image imparting to the user useful information concerning operation of the PDA and a background image, having a decorative function or imparting other information to the user. The processor causes the display 110 to display the main image alone, the background image alone or the background image and the main image simultaneously. The selection of whether to display the main image, the background image or both in general depends on the usage of the PDA 100. Generally, however, the background image will be displayed alone or at the same time as the main image at least when the personal organiser is at the top level of a menu hierarchy.

Figure 3A:
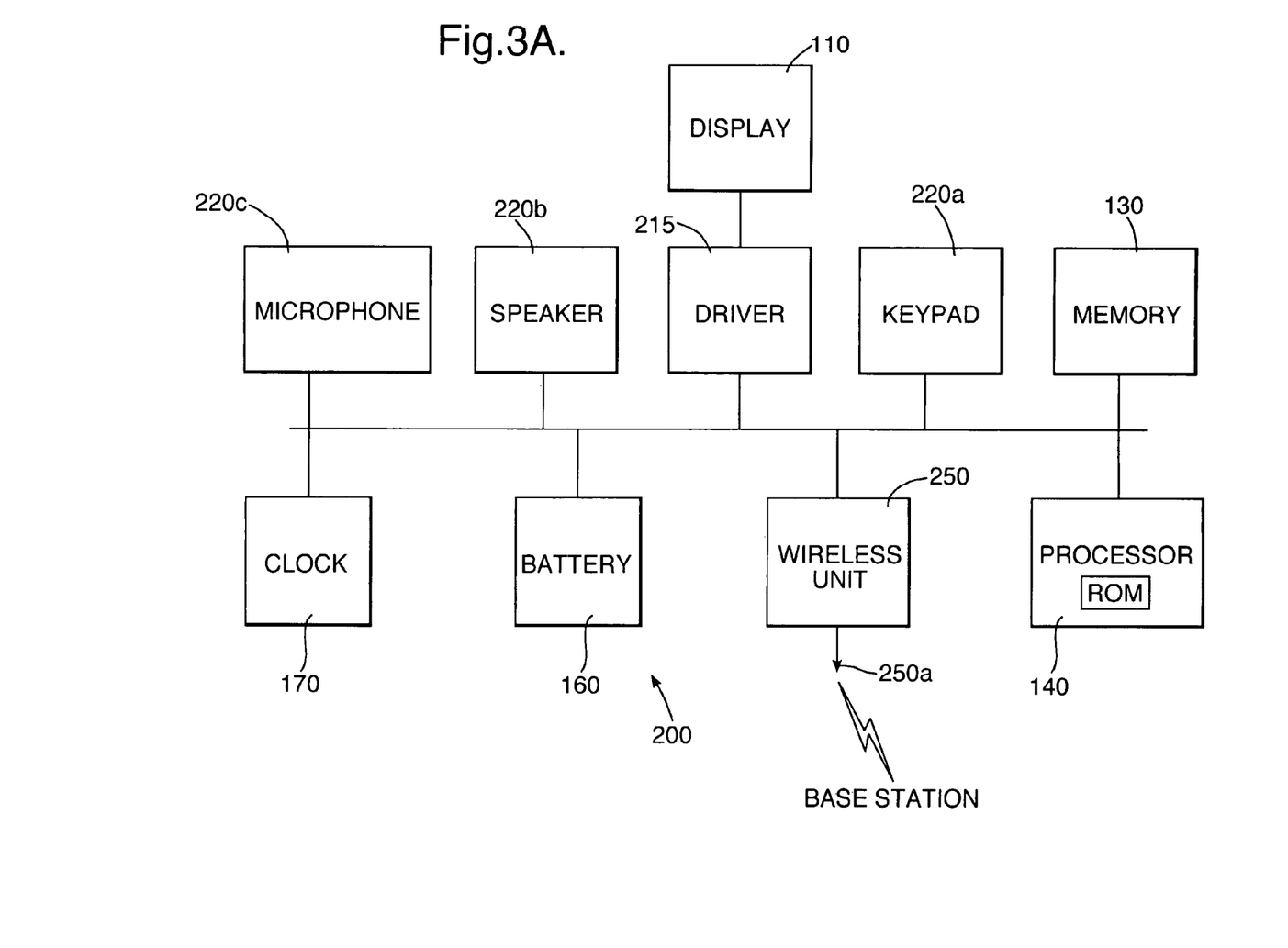
FIG. 3A is a block diagram of the architecture of a mobile phone suitable for use in the present invention.

FIG. 3A is a block diagram of the architecture of a mobile phone 200 suitable for use in the present invention. The mobile phone 200 shares many of the components of the PDA 100 shown in FIG. 2, including the display 110; the memory 130; the processor 140; the battery 160 and the clock 170. However, instead of the generalised input unit 120, FIG. 3A illustrates a keypad 220a for user input; a speaker 220b for allowing the user to hear a caller's voice, information tones and other sounds; and a microphone 220c, by which the user's voice and other sounds can be transmitted during a phone call or stored in the memory 130.

In addition, instead of the generalised signal unit 150, the mobile phone 200 is provided with a wireless unit 250 with an aerial 250a for transmission of data to and reception of data from a base station using microwaves, radio waves and/or any other suitable means. The wireless unit 250 may include a CODEC, a digital to analogue converter (DAC), an analogue to digital converter (ADC) and so forth.

The mobile phone 200 also includes a display driver 215, for control of the display 110. The display driver 215 includes a main display driver 216 and a background image display driver 217 termed a wallpaper driver. Each of the drivers 215, 216 includes a processor for processing data for output to the display 110 and corresponding display of the main and background images. Both display drivers are slaves to the master processor 140 and their operation is controlled by the master processor 140. However, they may include separate ROMs or be operated in accordance with programs stored in the memory 130. Thus, the master processor 140 instructs the main display driver 216 to output image data corresponding to a main image showing the information pertaining to the status of the mobile phone. For example, at the top level of a menu hierarchy, the display will show the main image shown in FIG. 1B. However, this main image will change depending on the use of the mobile phone 200, including as the user scrolls through different levels of the menu hierarchy and as calls are made and received. Similarly, the master processor 140 instructs the wallpaper display driver 217 to output image data for the background display at appropriate times, such as when the user is at the top level of the menu hierarchy. If both the main image and the background image are to be displayed at the same time, the display driver 215 combines the image data output from the two display drivers 216, 217. It may do this by 'OR'ing the respective image data or overlaying the main image on the background image.

In one embodiment, the wallpaper display driver 217 may include a memory in which data for a plurality of background images is stored. Alternatively, a plurality of background images is stored in the memory 130.

Figure 3B:
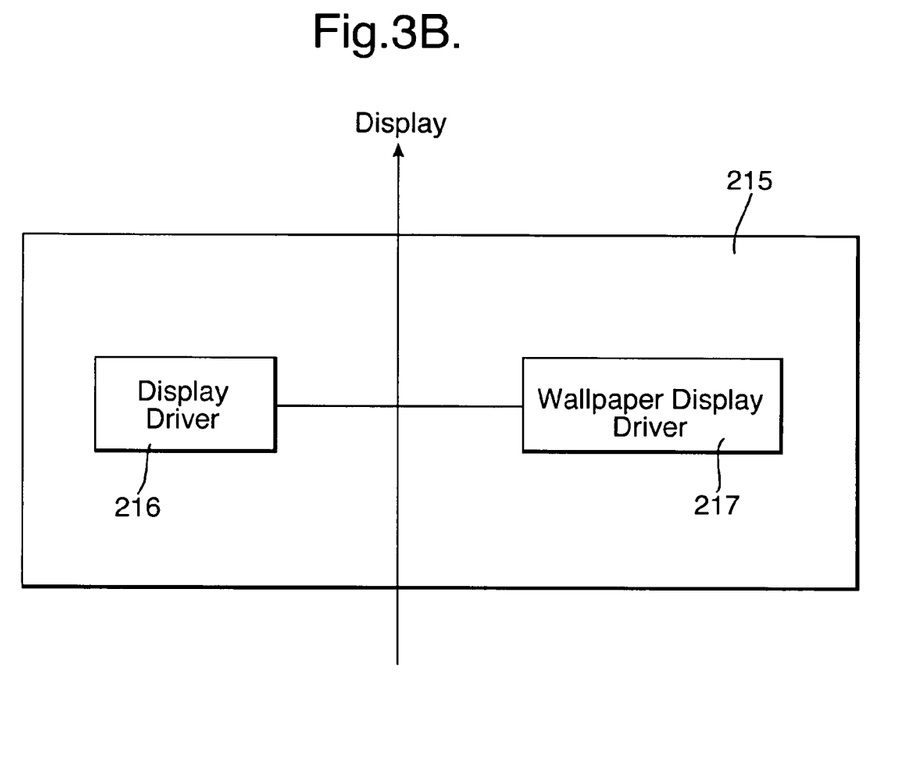
FIG. 3B is a block diagram of the architecture of the driver 215 shown in FIG. 3A.

Both the personal organiser 100 and the mobile phone 200 described above can be used in the present invention. It should be noted that the elements in the architectures shown in FIGS. 2, 3A and 3B are interchangeable and that the present invention is not limited to these specific embodiments of electronic devices. Thus, PDAs having the functionality of a mobile phone are also included in the present invention. In addition, although mobile electronic devices such as personal organisers and mobile phones are preferred, the present invention can also be applied to other electronic devices that include a display and have the ability to display a background image simultaneously with, or instead of a main image. Such other electronic devices include calculators, music players, games consoles, point-of-sale devices and the like.

In preferred but non-limiting embodiments, devices of the present invention are adapted to deactivate in consequence of a certain event, as discussed above in relation to the background to the present invention. In addition, in the present invention the electronic device is able to display a plurality of different background images. Preferably data for these different background images is stored either in the memory 130 or, if provided, in the wallpaper display driver 217. However, this data may be stored external to the electronic device.

In the present invention, each time a predetermined event relating to operation of the device occurs, a different background image is automatically selected for display. In a preferred embodiment, the predetermined event is a deactivation step, although other events such as the receipt of a phone call or message are also suitable.

Figure 4:
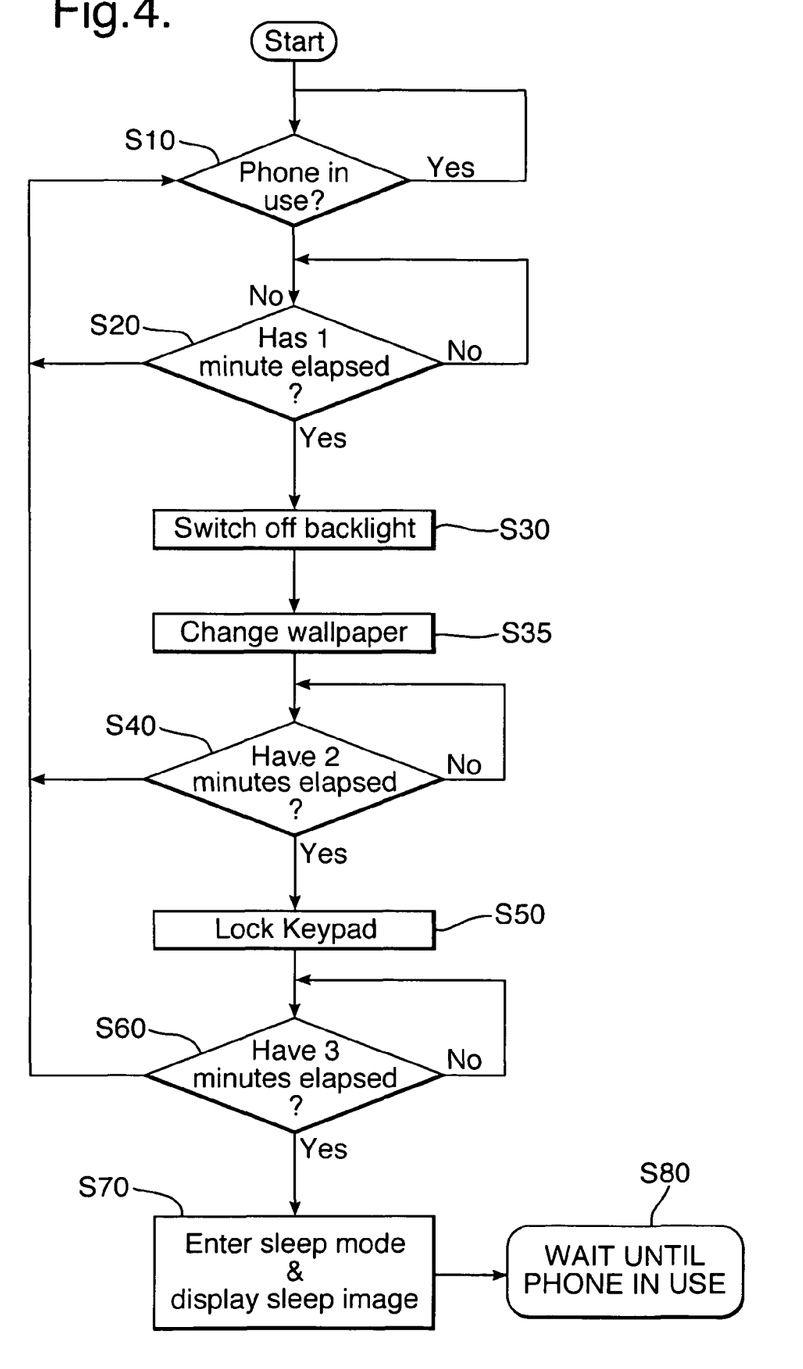
FIG. 4 is a flow chart illustrating a method embodying the present invention.

FIG. 4 shows an exemplary embodiment of the present invention and, specifically, a method of operating a mobile phone 200, in which the display comprises an LCD with a backlight. At step S10 the processor 140 continually determines whether the mobile phone 200 is in use, at which time the backlight is switched. When the processor determines that the mobile phone is not in use, it begins a timer to establish whether the phone has been out of use for one minute (S20). At this time, the phone preferably displays both the main image and the background image simultaneously, with the backlight switched on for a bright display. If the phone is used during the one minute period, the processor returns to step S10 and the backlight remains switched on. However, once the time elapsed since the phone was last used exceeds one minute, the processor moves from step S20 to step S30, in which the backlight of the display is turned off.

Immediately after step S30, the processor moves to step S35, in which it causes the displayed background image to change. Thus, the display continues to display the same main image but overlaid on a different background image. At this time, since the backlight is switched off, the display is more difficult to see. Subsequently, in step S40 the processor sets a timer to establish whether the phone has been out of use for a further two minutes. If the phone is used at any time in this period, for example because an incoming call is received or a button on the keypad is depressed, the processor 140 returns to step S10, in which the backlight is switched on and a main image is overlaid on the new background image.

Otherwise, the processor proceeds to step S50, in which it locks the keypad in a similar manner to that described above in respect of the background of the present invention. At this time the main image may change to inform the user that the keypad has been locked. However, the new background image remains unchanged and the backlight remains switched off.

Subsequently, the processor proceeds to step S60 in which it sets a timer to establish whether the phone has been out of use for a further three minutes. If the keypad is unlocked and the phone is used at any time in this period, the processor 140 returns to step S10, in which the backlight is switched on and an appropriate main image is displayed. Otherwise, the processor proceeds to step S70 in which the phone enters a sleep mode. In the sleep mode, a sleep image is displayed instead of both the main and background images. Alternatively, no image is displayed in the sleep mode. The processor then waits for the phone to be used again before initiating any further action.

Accordingly, each time the phone is deactivated by switching off the backlight at step S30, the background image that is displayed by the phone is changed in step S35. Consequently, the user is automatically shown a new background image for each new usage of the phone, when the backlight is switched on again. This is an attractive feature for users, and is of significant novelty value. For example, the phone may have stored in it several tens or even hundreds of different background images from which the processor may select. Consequently, the image presented to the user is consistently changed in an attractive manner.

Of course, the present invention is not limited to the specific method shown in FIG. 4. For example, the backlight may be switched on again after step S50, to clearly indicate to the user that the keypad is locked. At this time, the user will be confronted by a new background image—namely, the wallpaper selected by the processor in step S35. Subsequently, the light may be turned off before the sleep mode is entered.

In addition, the wallpaper changing step S35 may take place at other suitable times. For example, the wallpaper could instead be changed immediately after the keypad locking step S50. If the backlight is illuminated after the keypad locking step S50, then the background image could be changed before the backlight is illuminated, so that the backlit image displayed to the user is changed. Of course, the wallpaper changing step S35 could take place after any one or more deactivation steps, such as the sleep mode entering step S70, turning off the phone or other deactivations.

The wallpaper changing step need not take place after a deactivation step takes place. Instead or as well, it could occur each time any one or more predetermined levels in menu hierarchy are entered, or each time a phone call, short messaging service (SMS) message or multimedia messaging service (MMS) message is received. Thus, a wallpaper changing step could be programmed to take place after each of steps S30, S50 and S70, as well as each time a phone call is received, for example.

Figure 6:
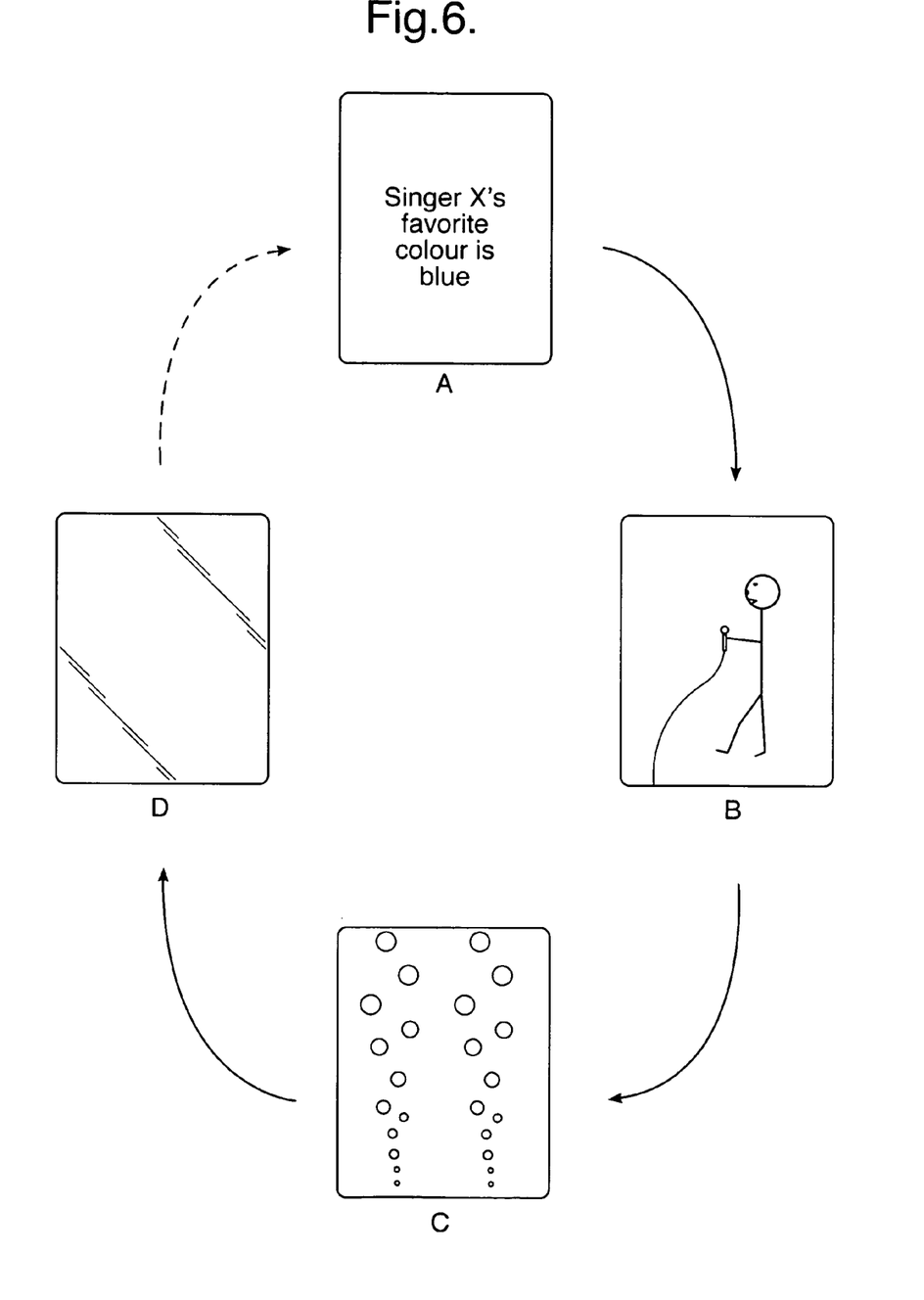
FIG. 6 is a diagram of several background images and illustrates a method embodying the present invention.

FIG. 6 shows an example of how the next background image to be displayed can be selected. The mobile phone or other electronic device stores a series of background images A, B, C, D . . . for display as wallpaper. The first background image selected for display as wallpaper is image A. Background image A is an item of trivia that relates to a well-known singer, and is of the kind enjoyed by children. The text in this background image could for example be displayed underneath the word "Andy" in the main image in FIG. 1B when that main image and background image A are displayed at the same time. After a deactivation step, or any other predetermined event, the background image automatically selected for display as the wallpaper is background image B, which is a photograph of a band in concert, again of the kind favoured by children. When the deactivation step or other predetermined event occurs again, the image C, showing bubbles, becomes the selected background image. Subsequently image D is selected and so on until image A is again selected for display as wallpaper. In this way, the stored background images are selected in rotation. This method of selecting background images is attractive if the background images are ordered in some way, for example if the background images are pictures showing and naming the presidents of the United States they can be displayed in chronological order. As an alternative, images A, B, C, D . . . could be selected by the processor 140 (or display driver 215 or wallpaper display driver 217) at random. This may be more attractive for other types of background image, such as patterns.

Figure 7:
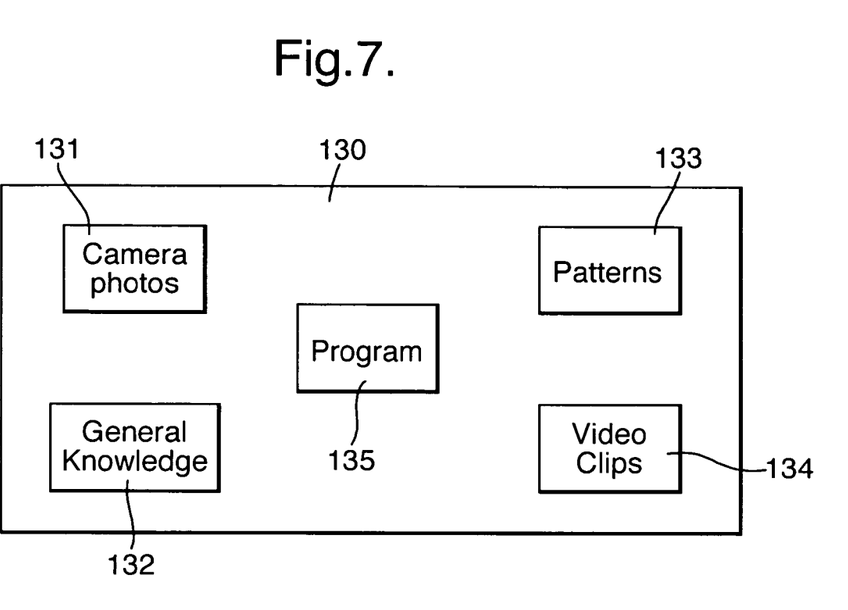
FIG. 7 is a block diagram of the memory of a mobile phone according to the present invention.

In another alternative, different background images could be stored in selected groups or folders in the memory. As an example, FIG. 7 shows the memory 130 storing four folders of background images, namely a "camera photographs" folder 131 in which are stored images taken by a digital camera incorporated in the mobile phone, a "patterns" folder 133 in which are stored background images comprising different patterns, a "general knowledge" folder 132 in which are stored items of general knowledge, and a "video clips" folder 134 in which are stored a series of video clips.

The processor can be set to rotate between different background images in a single folder or to select different background images in one folder at random. As another example, if the "general knowledge" folder is selected, then the processor may select a "question" background image at random, and then select the corresponding "answer" background image as the next wallpaper to be displayed. Subsequently, another "question" background image would be selected, and so on. Of course, images could be selected from more than one folder at a time. In another alternative, the images need not be stored in folders and the user can be allowed to determine which images can be selected by the processor 140, or to exclude certain images from selection by the processor 140.

In the exemplary method shown in FIG. 4, the newly selected background image is displayed immediately in step S35. However, this is not essential. For example, it would be possible instead to display the newly selected background image as wallpaper only when the phone is next used, for example by a user depressing a button on the keypad. Effectively, step S35 would be split into two steps, namely a wallpaper selection step occurring immediately after the predetermined event and a wallpaper display step occurring after that, for example when the phone is next used.

Similarly, step S35 occurs immediately after step S30. However, if desired it could occur at any predetermined time, for example one minute, after step S30. In that event, the predetermined event causing automatic selection of a new background image would be a combination of all the steps leading to step S30 and, in addition, the elapsing of a predetermined time without the phone being used. If the phone were to be used in the one minute period after step S30, no new background image would be selected.

It will be apparent to those skilled in the art that there are many permutations of the time for selecting the new wallpaper image and for displaying the newly selected wallpaper image. In particular, there are many possible predetermined events in consequence of which a new background image can be automatically selected for display as wallpaper. In a preferred embodiment, the user is able to select the predetermined events that will cause new background images to be automatically selected.

Accordingly, the present invention is particularly attractive to users seeking improved functionality of their mobile phones or other electronic devices. It is envisaged that the present invention will be particularly attractive to younger users, who will wish to show and compare with others the improved functionality of their mobile phones or other devices, as well as the background images displayed by their phones or other devices. In one embodiment, two users could set their phones to display "game" images. The changing background images displayed by their respective phones could then be used to play a game such as snap or trumps (in which, as an example, an automobile is displayed with its top speed and the user displaying the top speed wins).

FIGS. 2 and 3A both show the respective electronic device as including a memory 130 and it is preferred that software controlling the device to carry out the method of the present invention is stored in this memory. Thus, FIG. 7 shows memory 130 storing a program 135 for controlling the processor 140 to carry out the method of FIG. 4, either directly or by controlling the wallpaper display drive 217 in FIG. 3B. Alternatively, the processor may be controlled to carry out the method of the present invention by an instruction set stored in the ROM or hardwired in the device.

In one embodiment, the appropriate instruction set (program) for control of the processor in accordance with the present invention is stored in the electronic device on manufacture, or at least before sale of the device. However, the present invention comprises not only an electronic device and method as described above, it also includes a communications system and a method comprising transmitting to the electronic device software for controlling the device.

Figure 5:
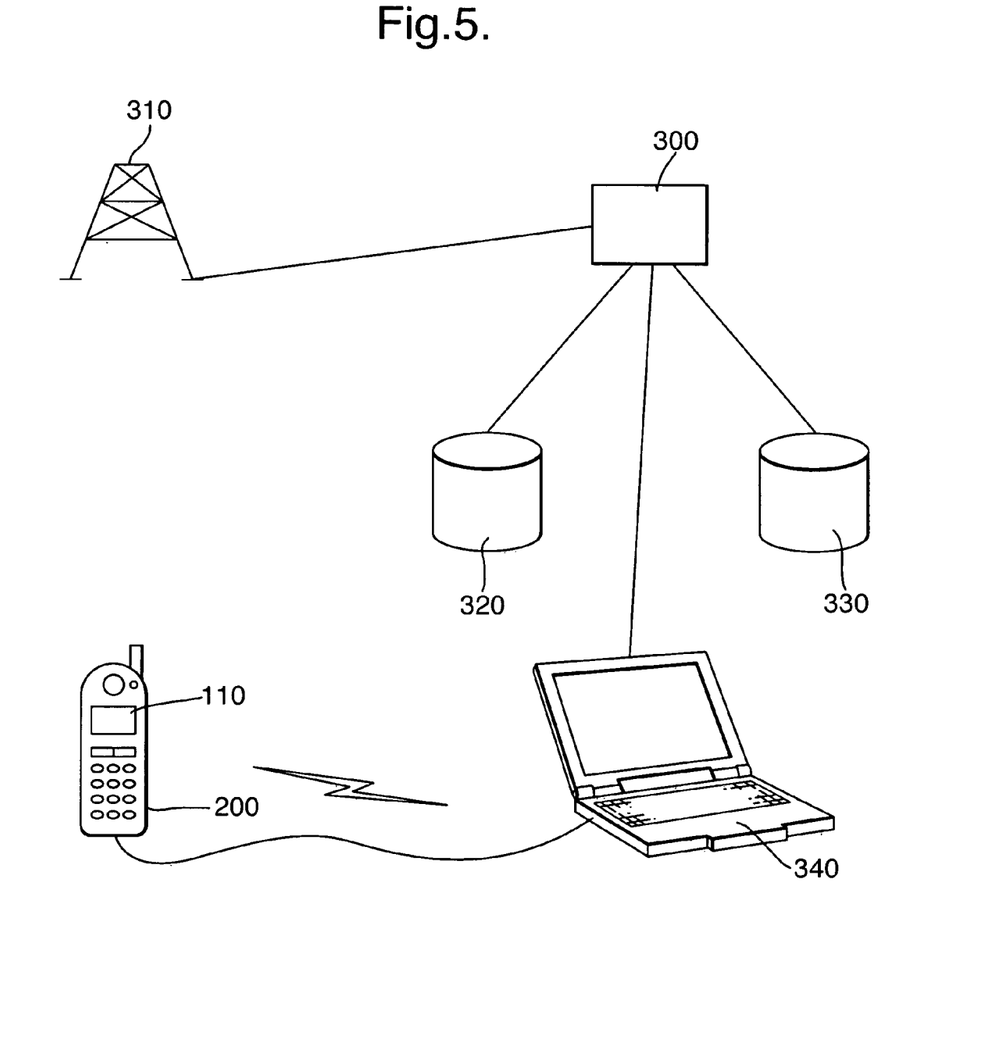
FIG. 5 is a schematic diagram of a communications network in which the present invention may be provided.

Thus, FIG. 5 shows a communications network in which an electronic device according to the present invention can be created and used. Specifically, FIG. 5 shows terrestrial telephone network 300, which provides signals to one or more base stations 310, for transmission of signals over the air, for example by microwaves or radio waves, to a mobile phone 200 with display 110. In addition, the network includes a computer 340 connected to the terrestrial telephone network 300 for receipt of signals over a landline. The computer 340 is in communication with the phone 200, for example by means of the Bluetooth or another wireless communications standard or using a physical lead. The network also includes web servers 320 and 330. Thus, the communications network is linked to or includes the Internet and at least the computer 340 is able to access the Internet, including the web servers 320 and 330. Satellite and other means of communication can also be included in the network.

In the event that the mobile phone is not programmed to operate in accordance with the present invention, a user may make a request to a service provider to transmit or download the appropriate software for his phone. The service provider, who may be an Internet service provider or a mobile phone signal carrier, may then transmit the software for use by the phone. Preferably, transmission is only effected for a fee or some other consideration.

The transaction may take place in a number of different ways. For example, the user may simply send an SMS text message over the air via a base station 210 to the service provider to send the software. Typically, the service provider will require credit card or other payment details, so that a fee can be collected, and details of the make and model of the mobile phone so that the appropriate software can be sent. The service provider may then transmit the appropriate software over the air as a series of data packets to the mobile phone 200 for storage in the memory 130. The software will then control the phone to operate in accordance with the present invention.

Alternatively, the user may make the request to the service provider over the Internet using the computer 340, with details of the mobile phone 200, including the number allocated to the phone so that the software can be sent to the correct device. As a further alternative, irrespective of whether the request is made from the phone 200 or the computer 340, the software may be sent to the computer 340 for subsequent uploading to the phone 200. This has the advantage that the transmission of the software to the user is performed using a terrestrial telephone network, which is in general considerably less expensive than the airtime that would be required for transmission direct to the phone 200 via the base station 310. Subsequently, the user can transfer the software from the computer over a wireless LAN, using a Bluetooth or other transmission protocol, or using a physical lead to the phone, at no additional cost.

Preferably, a suitable number of background images will be stored in the phone at the time of manufacture, or at least prior to sale. However, if desired, the user may upload images stored in the computer 340 to the phone for display as background images. The phone may support one or more of a number of different formats for display, such as the tif, .gif and .jpg formats. Depending on the formats supported by the phone, the computer converts the images as necessary before sending them to the phone. The uploaded images may all be stored together or in individual folders, as shown in FIG. 7.

In addition, service providers such as Internet service providers or signal carriers may send individual images or groups of images to the phone 200 for use as background images in accordance with the present invention. Specifically, the service providers may send images in consequence of one-off requests from users for an individual image or a group of images. They may also send different images at repeated intervals to a user who subscribes to this service. The sending of these images by service providers is preferably performed for a fee.

The present invention has been described with particular reference to mobile phones, but is also particularly applicable to personal organisers such as PDAs, portable music players, portable game consoles and other mobile electronic communications devices. Moreover, the present invention also encompasses all electronic devices capable of displaying background images as wallpaper, and includes point-of-sale devices.

In the foregoing description, the device includes a processor programmed to operate in accordance with the present invention. Preferably, the instruction set (that is, program) controlling the processor to operate in accordance with the present invention is software stored in a memory of the device. However, the instruction set may be hardwired in the device or may be stored remotely from the device and sent only as called upon by the processor. Similarly, the background images need not be stored in the device but can be sent to the device as called upon.

The present invention also includes not only an electronic device and method of operating an electronic device, but also a program for controlling an electronic device and a method of sending the program to an electronic device.

The foregoing description has been given by way of example only and it will be appreciated by a person skilled in the art that modifications can be made without departing from the spirit and scope of the present invention.

The invention claimed is:

1. An electronic device comprising:
a display including a light source;
a processor for causing the display to display a main image; and
a memory for storing a plurality of background images,
wherein the processor is arranged for causing the display to display one of the plurality of background images at the same time as or in preference to the main image,
wherein the light source is arranged to be deactivated in consequence of a predetermined event,
wherein a different background image is automatically selected from the plurality of background images for display in response to deactivation of the light source, wherein the light source is deactivated in consequence of an occurrence of the predetermined event, and
wherein the processor causes the display to display the different background image when the light source is reactivated.

2. An electronic device according to claim 1, wherein the predetermined event is the elapse of a predetermined time after the electronic device is last used.

3. An electronic device according to claim 1, wherein the display is a liquid crystal display.

4. An electronic device according to claim 1, wherein the device further comprises a keypad, which is deactivated by being locked in consequence of the predetermined event.

5. An electronic device according to claim 1, wherein the device is deactivated by entering a sleep mode.

6. An electronic device according to claim 1, wherein the predetermined event is the switching off of the electronic device.

7. An electronic device according to claim 1, wherein the processor changes background image immediately after the predetermined event.

8. An electronic device according to claim 1, wherein at least one of said plurality of background images is a moving image.

9. An electronic device according to claim 1, wherein at least one of said plurality of background images is a clock.

10. An electronic device according to claim 1, wherein the electronic device comprises a digital camera and at least one of said plurality of background images is a photograph taken using the digital camera.

11. An electronic device according to claim 1, wherein a user is able to select a subset of said plurality of background images from amongst which the processor causes the display to display said different background image.

12. An electronic device according to claim 1, wherein the processor selects the different background image at random from among the plurality of background images, or from among a subset of the plurality of background images.

13. An electronic device according to claim 1, wherein the processor selects each of the plurality of background images, or each background image in a subset of background images, in turn as the different background image.

14. An electronic device according to claim 1, wherein the device is a display unit for use in an electronic apparatus.

15. An electronic device according to claim 1, wherein the electronic device is a communications device.

16. An electronic device according to claim 1, wherein the electronic device is a cellphone.

17. An electronic device according to claim 1, further comprising means for downloading and storing further background images in the memory.

18. A method of displaying background images on an electronic device comprising a display including a light source, a processor for causing the display to display a main image, and a memory for storing a plurality of background images, the method comprising:
causing, by the processor, the display to display one of the plurality of background images at the same time as or in preference to the main image;
deactivating the light source in consequence of a predetermined event;
selecting, by the processor, a different background image from the plurality of background images in response to deactivation of the light source, wherein the light source is deactivated in consequence of an occurrence of the predetermined event; and
causing, by the processor, the display to display the different background image from the plurality of background images when the light source is reactivated.

19. A method according to claim 18, wherein the predetermined event is the elapse of a predetermined time after the electronic device is last used.

20. A method according to claim 18, wherein the display is a liquid crystal display.

21. A method according to claim 18, wherein the device further comprises a keypad, which is deactivated by being locked in consequence of the predetermined event.

22. A method according to claim 18, wherein the device is deactivated by entering a sleep mode.

23. A method according to claim 22, further comprising causing the display to display a sleep mode image in the sleep mode.

24. A method according to claim 18, wherein the predetermined event is the switching off of the electronic device.

25. A method according to claim 18, comprising changing the background image immediately after the predetermined event.

26. A method according to claim 18, wherein at least one of said plurality of background images is a moving image.

27. A method according to claim 18, wherein at least one of said plurality of background images is a clock.

28. A method according to claim 18, wherein the electronic device comprises a digital camera, the method further comprising causing the display to display at least one photograph taken using the digital camera as a said background image.

29. A method according to claim 18, comprising selecting a subset of said plurality of background images from amongst which the processor causes the display to display said different background image.

30. A method according to claim 18, comprising causing the processor to select the different background image at random from among the plurality of background images, or from among a subset of the plurality of background images.

31. A method according to claim 18, comprising causing the processor to select each of the plurality of background images, or each background image in a subset of background images, in turn as the different background image.

32. A method according to claim 18, comprising storing additional background images in the memory.

33. A method according to claim 32, comprising transmitting the additional background images to the electronic device for storing in the memory.

34. A method according to claim 18, comprising transmitting software to the electronic device for controlling the processor.

35. A method according to claim 34, comprising storing the software in the memory.

36. A cellphone comprising:
- a display device including a light source;
- a storage device on which is stored a plurality of images; and
- a control device arranged to select a different one of said images to be displayed as wallpaper on said display, wherein the selection is made in response to the display entering a power saving mode and turning off the light source, and to cause the display to display the different background image as wallpaper when the light source is reactivated.

37. A computer-implemented method for a cellphone that comprises a display including a light source, a processor for causing the display to display a main image and a memory for storing a plurality of background images, the method comprising:
- causing the display to display a background image at the same time as or in preference to the main image;
- selecting a different background image in response to deactivation of the light source, wherein the light source is deactivated in consequence of a predetermined event; and
- causing the display to display the different background image when the light source is reactivated.

38. A computer-implemented method for a cellphone, the method comprising:
- causing the cellphone to display an image as wallpaper;
- causing the cellphone to enter a power saving mode and deactivate a light source for a display on the cellphone;
- causing the cellphone to select a different image to be displayed as wallpaper in response to deactivation of the light source; and
- causing the cellphone to display the different background image when the light source is reactivated.

39. A non-transitory computer readable medium on which is stored a program for a cellphone that comprises a display including a light source, a processor for causing the display to display a main image and a memory for storing a plurality of background images, the program when executed by the cellphone to:
- cause the display to display a background image at the same time as or in preference to the main image;
- select a different background image in response to deactivation of the light source, wherein the light source is deactivated in consequence of a predetermined event; and
- cause the display to display the different background image when the light source is reactivated.

40. A non-transitory computer readable medium storing instructions for a device that, when executed, cause the device to:
- cause a display to display one of a plurality of background images at the same time as or in preference to a main image;
- deactivate a light source for the display in consequence of a predetermined event; and
- cause the display to display a different background image from the plurality of background images, wherein the different background image is selected in response to deactivation of the light source, wherein the light source is deactivated in consequence of an occurrence of the predetermined event and the different background image is displayed when the light source is reactivated.

* * * * *